United States Patent [19]
Peterson

[11] Patent Number: 6,057,871
[45] Date of Patent: May 2, 2000

[54] LASER MARKING SYSTEM AND ASSOCIATED MICROLASER APPARATUS

[75] Inventor: Brian Lee Peterson, Charlotte, N.C.

[73] Assignee: Litton Systems, Inc., Charlotte, N.C.

[21] Appl. No.: 09/113,655

[22] Filed: Jul. 10, 1998

[51] Int. Cl.$^7$ .............................. B41J 2/455; B41J 2/47; H01S 3/091

[52] U.S. Cl. ............................. 347/238; 372/22; 372/23; 372/36; 372/50; 372/75

[58] Field of Search .................................. 347/238, 241, 347/242, 257, 256, 245; 372/22, 23, 36, 50, 75

[56] References Cited

U.S. PATENT DOCUMENTS

| | | |
|---|---|---|
| 3,622,906 | 11/1971 | Nyul . |
| 3,760,175 | 9/1973 | Gibson et al. . |
| 3,783,353 | 1/1974 | Pankove . |
| 3,899,826 | 8/1975 | Russ . |
| 3,994,430 | 11/1976 | Cusano et al. . |
| 4,549,784 | 10/1985 | Inokuchi . |
| 4,734,714 | 3/1988 | Takasu et al. . |
| 4,942,405 | 7/1990 | Dody et al. . |
| 5,157,235 | 10/1992 | Okumura et al. . |
| 5,231,263 | 7/1993 | Kuwabara et al. . |
| 5,260,542 | 11/1993 | Ishiguro et al. . |
| 5,309,273 | 5/1994 | Mori et al. . |
| 5,394,413 | 2/1995 | Zayhowski . |
| 5,402,436 | 3/1995 | Paoli . |
| 5,432,878 | 7/1995 | Smous . |
| 5,463,649 | 10/1995 | Ashby et al. . |
| 5,495,494 | 2/1996 | Molva et al. . |
| 5,570,387 | 10/1996 | Carriere et al. ............................ 372/50 |
| 5,587,094 | 12/1996 | Yoshida et al. . |
| 5,605,641 | 2/1997 | Chiba et al. . |
| 5,640,188 | 6/1997 | Andrews . |
| 5,646,674 | 7/1997 | Bacon et al. . |
| 5,724,458 | 3/1998 | Katoh et al. . |
| 5,793,405 | 8/1998 | Shakuda .................................. 347/238 |
| 5,796,771 | 8/1998 | DenBaars et al. ........................ 372/75 |
| 5,923,692 | 7/1999 | Staskus et al. ............................ 372/50 |
| 5,982,802 | 11/1999 | Thony et al. ............................. 372/75 |

OTHER PUBLICATIONS

Brochure for sfim ODS, *Microchip Lasers—All–in–one Lasers—An Original Concept—For Innovative Solutions*.

Primary Examiner—Alan A. Mathews
Attorney, Agent, or Firm—Alston & Bird LLP

[57] ABSTRACT

A laser marking system and an associated microlaser apparatus are provided which include a submount, a plurality of pump sources operably mounted upon the submount, and a microlaser disposed in alignment with the pump sources such that pump signals emitted by the pump sources pump respective portions of the active gain medium of the microlaser to produce a laser output. In order to impart a mark upon a workpiece that has a number of pixels, the laser marking system can be configured such that each pixel of the resulting mark is produced by the laser output generated by a different portion of the active gain medium of the microlaser in response to pumping by a respective one of the pump sources.

32 Claims, 4 Drawing Sheets

LASER MARKING SYSTEM AND ASSOCIATED MICROLASER APPARATUS

FIELD OF THE INVENTION

The present invention relates generally to marking systems and, more particularly, to laser systems for marking workpieces with predefined indicia.

BACKGROUND OF THE INVENTION

A variety of marking systems have been developed for marking a workpiece, such as with a Universal Product Code ("UPC") or the like. More particularly, a number of laser marking systems have been developed as shown by U.S. Pat. No. 5,309,273 which issued on May 3, 1994, U.S. Pat. No. 5,587,094 which issued on Dec. 24, 1996 and U.S. Pat. No. 5,605,641 which issued on Feb. 25, 1997.

A conventional laser marking system includes a laser source, such as $CO_2$ laser or a yttrium aluminum garnet (YAG) laser oscillator, capable of producing a laser beam having relatively high power levels. Conventional laser marking systems also include a number of masks or templates which define the pattern to be marked upon the workpiece. The laser beam emitted by the laser source is generally deflected in a controlled manner in both the X and Y directions so as to be raster scanned across a mask. Typically, the deflection of the laser beam in the X direction is provided by a polygonal mirror which is rotated at a predetermined rate, while the deflection of the laser beam in the Y direction is provided by a galvanometer scanner or the like. After passing through the mask, the laser beam can again be deflected in the X and Y directions such as by a pair of galvanometers, so as to be directed to the surface of the workpiece which is to be marked.

The mask of a conventional marking system defines the predetermined pattern which is to be marked upon a surface of the workpiece. In order to imprint different patterns upon different workpieces, a laser marking system can include a number of different masks, each of which defines a different predetermined pattern. By inserting an appropriate mask into the path of the laser beam, conventional marking systems can mark a workpiece with the desired pattern. As such, the masks can be supported by a rotating wheel such that a different mask can be inserted between the laser source and the workpiece by controllably rotating the wheel. As will be apparent, laser marking systems that are designed to imprint a variety of patterns upon a workpiece generally require a large number of masks which must be repeatedly inserted into and removed from the path of the laser beam in order to mark a workpiece with the desired pattern.

Accordingly, liquid crystal masks have been developed. By applying appropriate voltages to the electrode lines defined upon the front and rear surfaces of a liquid crystal mask, a liquid crystal mask can be configured to permit light having a predetermined pattern to pass therethrough. By altering the manner in which voltage is applied to the electrode lines, however, the liquid crystal mask can be reconfigured so as to permit light having a different pattern to propagate therethrough. Thus, a single liquid crystal mask can define a number of different patterns by controllably applying voltages to the electrode lines on the front and rear surfaces of the liquid crystal mask. By utilizing a liquid crystal mask, the laser marking system no longer requires a plurality of different masks that must be repeatedly inserted into and removed from the path of the laser beam in order to mark a workpiece with different patterns. However, a liquid crystal mask is generally relatively expensive which correspondingly increases the cost of the laser marking system. Thus, while a variety of marking systems and, more particularly, a variety of laser marking systems have been developed, a need still exists for more economical laser marking systems.

SUMMARY OF THE INVENTION

According to the present invention, a laser marking system and an associated microlaser apparatus are provided which include a submount, a plurality of pump sources for emitting pump signals, and a microlaser disposed in alignment with the pump signals emitted by the pump sources such that pump signals pump respective portions of the active gain medium of the microlaser to produce a laser output. In order to impart a mark upon a workpiece that has a number of pixels, the laser marking system of one advantageous embodiment can be configured such that each pixel of the resulting mark is produced by the laser output generated by a different portion of the active gain medium of the microlaser in response to pumping by a respective one of the pump sources. Thus, the laser marking system can produce a number of different marks without requiring one or more masks by appropriately pumping different portions of the active gain medium of the microlaser with different ones of the pump sources. By imparting marks having different patterns upon a workpiece without requiring one or more marks, the laser making system of this advantageous embodiment is generally less complex and more economical than conventional laser marking systems.

According to the present invention, the submount is preferably comprised of a thermally conductive, electrically insulating material. In addition, the submount has opposed first and second surfaces and defines a groove opening through a first surface of the submount. In order to align the microlaser with the pump signals directed through the opening defined in the first surface of the submount, the microlaser can be seated within the groove. In particular, the microlaser generally has opposed first and second surfaces and includes an active gain medium proximate the first surface and saturable absorber proximate the second surface. As such, the microlaser is preferably seated within the groove defined by the submount such that portions of the first surface of the microlaser contact the submount, while other portions of the first surface of the microlaser are spaced from the submount in a facing relationship to the plurality of pump sources. As such, the pump signals emitted by the pump sources can pump portions of the active gain medium of the microlaser that are spaced from the submount.

According to one embodiment, the microlaser apparatus includes a plurality of submounts positioned in a spaced apart relationship such that the microlaser extends across and is supported by the plurality of submounts. Typically, the submounts of this embodiment define respective grooves extending lengthwise between opposed endwalls. As such, the pump sources can be operably mounted upon the endwalls of the submounts such that the pump signals emitted by the pump sources are directed toward respective portions of the active gain medium of the microlaser that extend unsupported between the submounts.

According to another embodiment, the submount defines a lengthwise extending groove over which the microlaser at least partially overlies. The groove defined by the submount of this embodiment is defined by a pair of sidewalls upon which the pump sources are operably mounted such that the pump signals are directed toward the microlaser that overlies the groove. In this embodiment, the groove can include a lengthwise extending lower channel and the submount can include a pair of shelves extending laterally from the lower channel and disposed proximate to the first surface of the submount to thereby define an upper channel that is broader than the lower channel in the lateral direction. As such, the microlaser can be supported over the lower channel by the shelves. By operably mounting the plurality of pump sources upon portions of the sidewalls which define the lower channel, the pump signals emitted by the pump sources can be directed toward respective portions of the microlaser that extend unsupported over the lower channel.

The microlaser apparatus of either embodiment can also include a number of thermal spreaders mounted upon the submount. A pump source, such as a laser diode, is, in turn, mounted upon each respective thermal spreader. Each thermal spreader extends between the first and second edges. According to one embodiment in which the thermal spreaders are mounted to the sidewalls of the groove defined by the submount, each laser diode is mounted adjacent the first edge of the respective thermal spreader. According to this embodiment, the thermal spreaders and the groove defined by the submount are preferably sized such that the laser diodes are properly spaced from the active gain medium of the microlaser once the thermal spreaders are positioned within the groove such that the second edge of the thermal spreaders contact a bottom surface of the groove defined by the submount.

While the microlaser apparatus of the present invention can be employed in a variety of applications, a laser marking system particularly benefits from the controlled laser pulses provided by the microlaser apparatus. In this regard, the laser pulses produced by the microlaser in response to pump signals emitted by the pump sources can be focused upon a workpiece in order to mark the workpiece with a predefined pattern. Since different portions of the microlaser will emit laser pulses in response to pumping by different ones of the pump sources, a laser marking system which includes the microlaser apparatus of the present invention can impart a mark comprised of a number of pixels, each of which is produced by laser pulses output by respective portions of the microlaser which, in turn, are generated by pump signals emitted by a respective pump source.

According to one embodiment, the laser marking system is designed to produce a mark having a plurality of multicolor pixels. As such, the plurality of pump sources of the microlaser apparatus can include a plurality of groups of pump sources. Each group of pump sources cooperates to pump respective portions of the active gain medium of the microlaser so as to produce one of the pixels. The laser marking system of this embodiment can also include at least one frequency multiplication element associated with each group of pump sources for multiplying the frequency of the laser output produced by the microlaser to thereby generate a pixel of a predetermined color. For example, the group of pump sources can include first, second and third pump sources for separately pumping a respective portion of the active gain medium of the microlaser. In addition, the laser marking system of this exemplary embodiment can include first and second frequency multiplication elements for multiplying the frequency of the laser output produced by the microlaser in response to pumping of the respective portion of the active gain medium by the second and third pump sources, respectively, to thereby generate a multicolor pixel.

Therefore, the microlaser apparatus of the present invention includes a submount which facilitates the alignment of a plurality of pump sources, such as a plurality of laser diodes, with at least one microlaser in order to controllably pump different portions of the active gain medium of the microlaser. By incorporating a microlaser apparatus, the laser marking system of the present invention can produce a predefined laser output having a number of pixels, such as for marking a workpiece, without requiring one or more masks. As such, the complexity and, correspondingly, the cost of the marking system is reduced relative to conventional laser marking systems. Moreover, the laser marking apparatus of one advantageous embodiment of the present invention is designed to provide a multicolor laser output.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
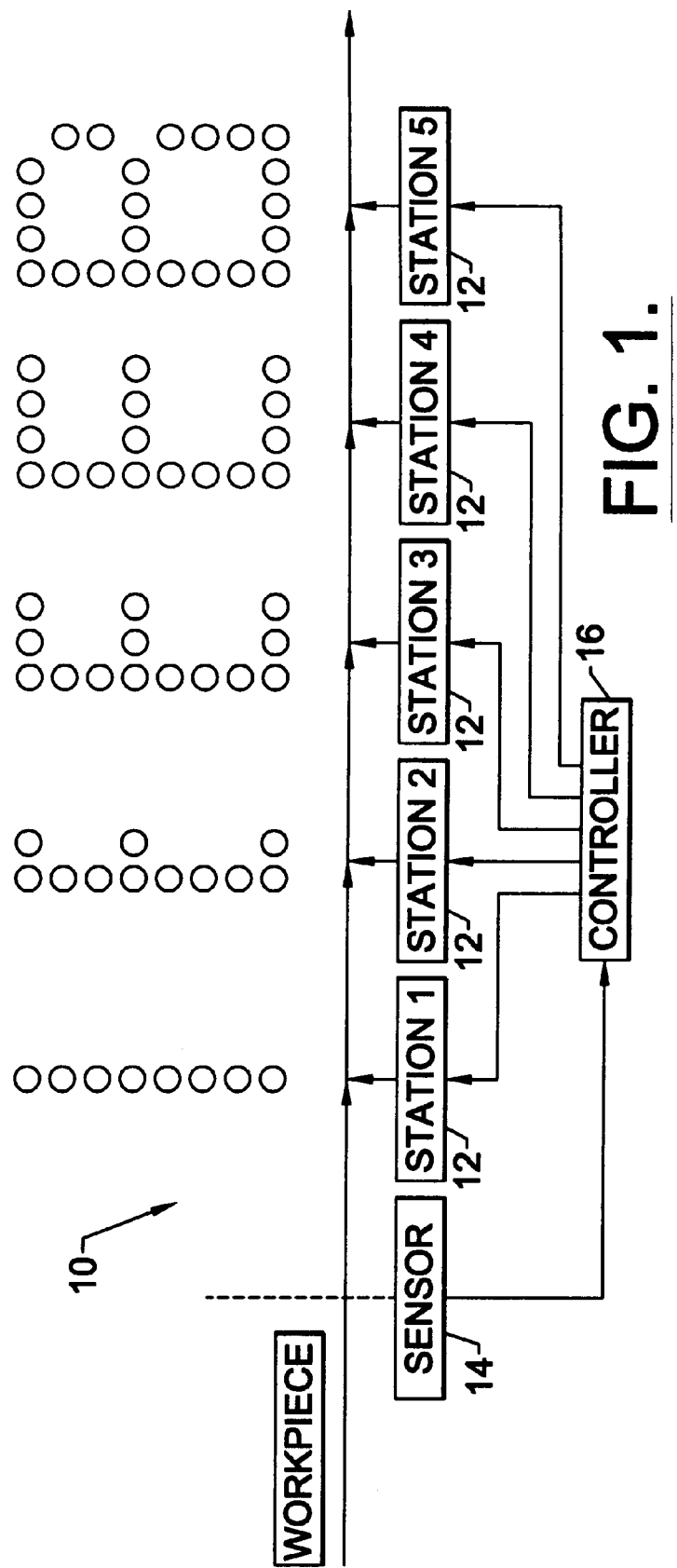
FIG. 1 is a schematic perspective view illustrating a conveyor system for moving workpieces past a plurality of laser marking stations of one embodiment to the present invention so that different portions of the resulting mark can be successively imprinted upon the workpieces.

Referring now to FIG. 1, a conveyor system 10 for transporting workpieces, such as cans, boxes, bags, wire jackets or the like, along a predefined path of travel is illustrated. Although the workpieces can be formed of a variety of materials, the workpieces are commonly formed of aluminum, high density polyethylene (HDPE), polypropylene, wood, teflon or polyethylene terephthalate (PET). In addition, the workpieces can have a variety of shapes and can have either smooth or corrugated surfaces. A plurality of laser marking systems or stations 12 according to the present invention are positioned at locations spaced along the path of travel defined by the conveyor system. While the laser marking stations are depicted to be spaced at equal intervals in FIG. 1, the laser marking stations can be spaced at other intervals, if so desired. As shown, the conveyor system also generally includes one or more sensors 14, such as one or more optical sensors, for detecting movement of a workpiece past a predefined point on the path of travel defined by the conveyor system.

As schematically illustrated in FIG. 1, each of the laser marking stations 12 is responsive to a control system 16. While the control system of FIG. 1 is illustrated to be a single, centralized control system, the control system can be distributed such that a separate control system is associated with each of the laser marking stations, if so desired. Typically, the control system is embodied by a controller or processor operating under the control of software stored either internally within the controller or processor or externally within a memory device associated with the controller or processor.

Upon sensing movement of a workpiece past a predetermined point along the path of travel, the sensor 14 notifies the control system 16. Based upon the signal received from the sensor and the speed of the conveyor system 10, the control system will successively actuate the laser marking stations 12. In particular, the control system will time the actuation of the laser marking stations such that each laser marking station produces a predefined laser output as the workpiece passes by the respective laser marking station. By appropriately controlling the laser marking stations, a composite mark can be imprinted upon the workpiece which is formed of the marks imprinted upon the workpiece by each of the laser marking stations. For example, the laser marking stations can cooperate to mark the workpiece with a dot matrix pattern which defines a letter, a numeral or other symbol. In order to mark a workpiece with a 5×8 dot matrix pattern comprised of forty pixels arranged in five columns and eight rows, each laser marking station would generally be capable of marking the workpiece with the pixels which form a respective column or a respective row depending upon the relative orientations of the workpiece and the laser marking stations.

As an example in which a workpiece is to be marked with the letter B, the first laser marking station 12 can mark the workpiece with each of the eight pixels in the first column as shown in FIG. 1 above the first laser marking station. Thereafter, the second, third and fourth laser marking stations can mark the workpiece with the pixels from the second, third and fourth columns, respectively. As shown in FIG. 1 above the respective laser marking stations, the second, third and fourth laser marking stations of this embodiment only imprint pixels from rows one, four and eight in columns two, three and four. Finally, the fifth laser marking station can mark the workpiece with the pixels in column five, namely, the pixels in rows two, three, five, six, seven and eight of column five. As such, the resulting workpiece will be marked with the letter B as shown schematically in FIG. 1 above the fifth laser marking station.

As described hereinafter, each laser marking system or station 12 of the present invention can be fabricated in several different manners. In each embodiment, however, the laser marking system includes a submount 20, a plurality of pump sources 22 for emitting pump signals, and an active gain medium 24 disposed in alignment with the pump signals emitted by the pump sources such that the pump signals pump the active gain medium. See, for example, the embodiments of FIGS. 2 and 5. As such, the active gain medium of the laser marking system will produce a predefined laser output upon activation of respective ones of the pump sources, such as by the control system 16 described in conjunction with FIG. 1.

Preferably, the laser marking system 12 includes a microlaser apparatus 18 which includes the submount 20, the plurality of pump sources 22 operably mounted to the submount and at least one microlaser 26 aligned with the plurality of pump sources such that the pump signals emitted by the pump sources pump the active gain medium 24 of the microlaser in order to produce the predefined laser output. As described hereinafter, however, the microlaser apparatus of the present invention can be employed in applications other than laser marking systems without departing from the spirit and scope of the present invention.

Typically, the plurality of pump sources 22 include a plurality of laser diodes operably mounted to the submount 20. For example, the laser diode of one advantageous embodiment is formed of gallium arsenide and provides 1.2 watts of pump power. However, the microlaser apparatus 18 can include other types of laser sources, including other types of laser diodes, or other types of pump sources, if so desired. For example, the pump source(s) can be located remote from the submount 20 such that the pump signals are delivered via one or more optical fibers and are directed through the opening defined in the first surface of the submount, as described hereinbelow.

Figure 2:
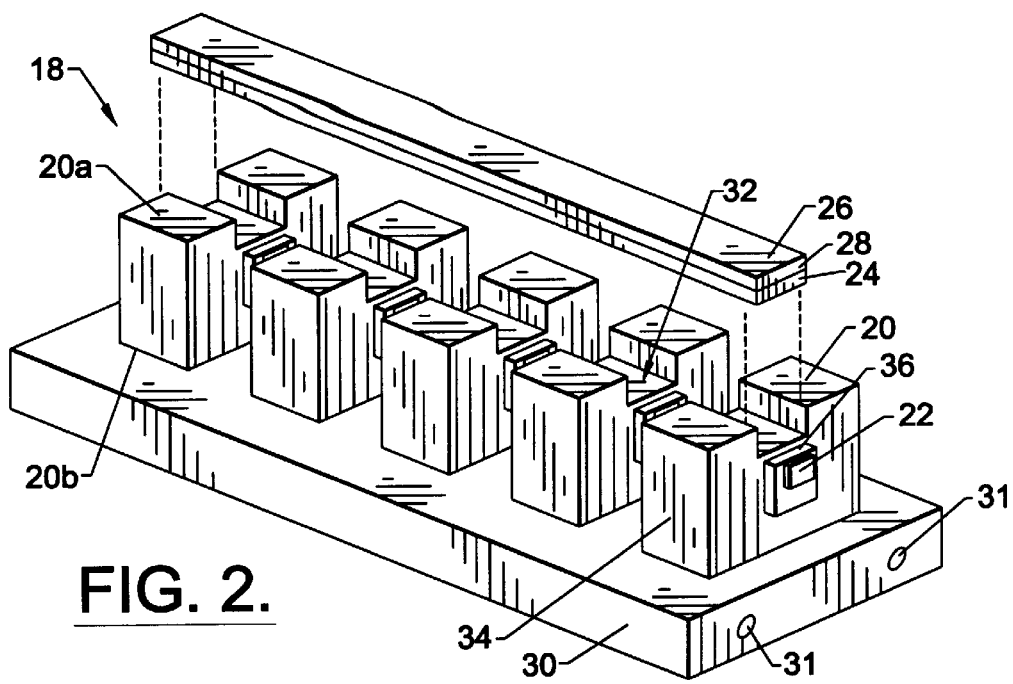
FIG. 2 is an exploded perspective view of a microlaser apparatus according to one advantageous embodiment of the present invention.
Figure 5:
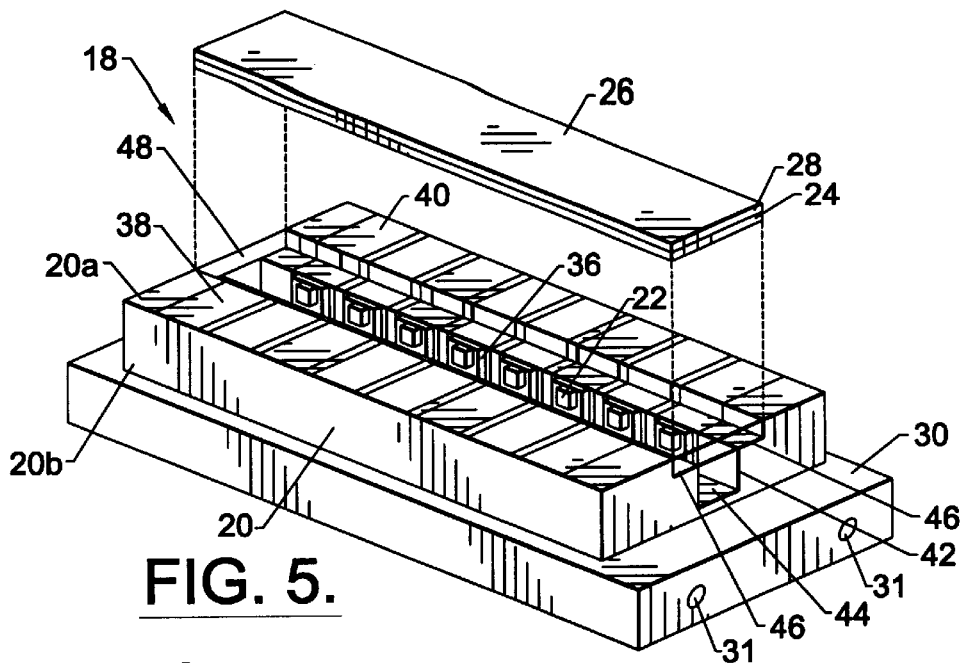
FIG. 5 is an exploded perspective view of a microlaser apparatus according to another advantageous embodiment of the present invention.

As known to those skilled in the art, a microlaser 26, such as shown in FIGS. 2 and 5, includes the active gain medium 24 and a saturable absorber 28. Typically, the active gain medium and the saturable absorber are sandwiched between a pair of mirrors that define a resonant cavity. In this regard, one example of a suitable microlaser is described by U.S. Pat. No. 5,394,413 to John J. Zayhowski which issued on Feb. 28, 1995, the contents of which are incorporated in their entirety herein. According to one advantageous embodiment, the microlaser includes an active gain medium formed of neodymium-doped YAG and a saturable absorber formed of tetravalent chrome-doped YAG. Although the active gain medium of one advantageous embodiment is doped with approximately 1.6 atomic percent of neodymium, the active gain medium and the saturable absorber can include different dopant percentages without departing from the spirit and scope of the present invention. The microlaser of this embodiment will emit laser pulses having a wavelength of 1.06 nanometers. As will be apparent to those skilled in the art, however, the active gain medium and the saturable absorber can be constructed of different materials in order to provide laser outputs having different properties, such as different wavelengths.

As shown in FIG. 2, the submount assembly of the microlaser apparatus 18 of one embodiment includes a heat sink 30 and a submount 20 mounted upon the heat sink. Although the submount can be mounted upon the heat sink in a variety of manners, the submount of one embodiment is attached to the heat sink by means of a layer 33 of diffusion bonded copper (DBCu) which facilitates heat transfer therebetween. See FIG. 3. One advantageous technique for attaching components with DBCu is described in U.S. Pat. No. 3,994,430 which issued on Nov. 30, 1976 to Dominic A. Cusagno, et al. As will be understood by those having skill in the art, an element or component that is described as being "on" or "mounted upon" another element may be either mounted directly on the underlying element or may merely overlie the other element with one or more intervening layers or elements being disposed between the elements.

Although the heat sink can be a passive heat sink formed of thermally conductive material, such as a silver base plated with an alloy of gold and nickel, the heat sink can also be an active heat sink or heat pump, such as a Peltier heat pump or other thermoelectric cooler, which includes inlet and outlet ports 31 as shown in FIGS. 2 and 5. As used herein, the term "heat sink" therefore includes not only heat sinks which cool a component by dissipating waste heat, but also heat pumps which generate additional heat in order to warm a component.

The submount 20 is formed of a thermally conductive material for providing a path of low thermal impedance to the heat sink 30. According to the present invention, the material which forms the submount is also preferably electrically insulating so as to electrically isolate the various electro-optic components mounted upon the submount. For example, the submount effectively electrically isolates the plurality of laser diodes 22 and the microlaser 26 as described below. Although the submount can be formed of a variety of thermally conductive, electrically insulating materials, the submount of one advantageous embodiment is formed of beryllium oxide, aluminum oxide or aluminum nitride which are both thermally conductive and electrically insulating.

As illustrated in FIG. 2, the microlaser apparatus 18 of one embodiment includes a plurality of submounts 20 positioned in a spaced apart relationship. In particular, the submounts can be mounted upon the heat sink 30 in a spaced apart relationship. As also shown in FIG. 2, the microlaser 26 of this embodiment can then be extended across and supported by the plurality of submounts.

Figure 4:
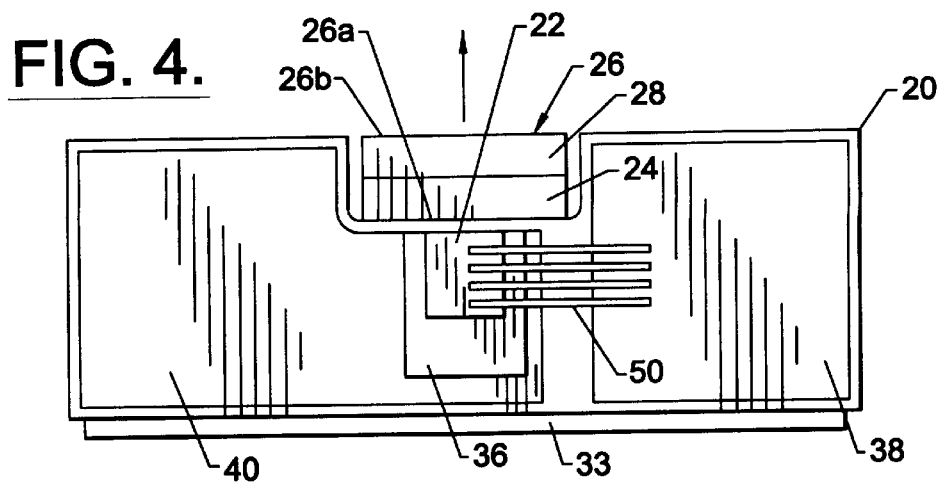
FIG. 4 is a plan view of a submount, a thermal spreader, a laser diode and a microlaser of the microlaser apparatus of FIG. 2.

Each submount 20 has opposed first and second surfaces 20a, 20b. In addition, each submount preferably defines a groove 32 opening through the first surface of the submount and extending lengthwise between a pair of opposed endwalls 34. As shown in FIGS. 2 and 4, the grooves defined by the submounts are preferably sized to receive the microlaser 26 such that the microlaser can be seated within the respective grooves. In particular, for a microlaser having an active gain medium 24 proximate a first surface 26a, and a saturable absorber 28 proximate an opposed second surface 26b, the microlaser is preferably seated within the grooves defined by the submounts such that portions of the first surface of the microlaser contact and are supported by the submounts. However, other portions of the first surface of the microlaser are preferably spaced from the submounts. In this regard, the first surface of those portions of the microlaser that extend between the submounts are spaced from the submounts and are not directly contacted by the submounts. Although the microlaser can be secured to the submounts in a variety of manners, the microlaser of one embodiment is secured to the submounts by means of an epoxy disposed between those portions of the first surface of the microlaser that contact the submount and the submount itself.

Figure 3:
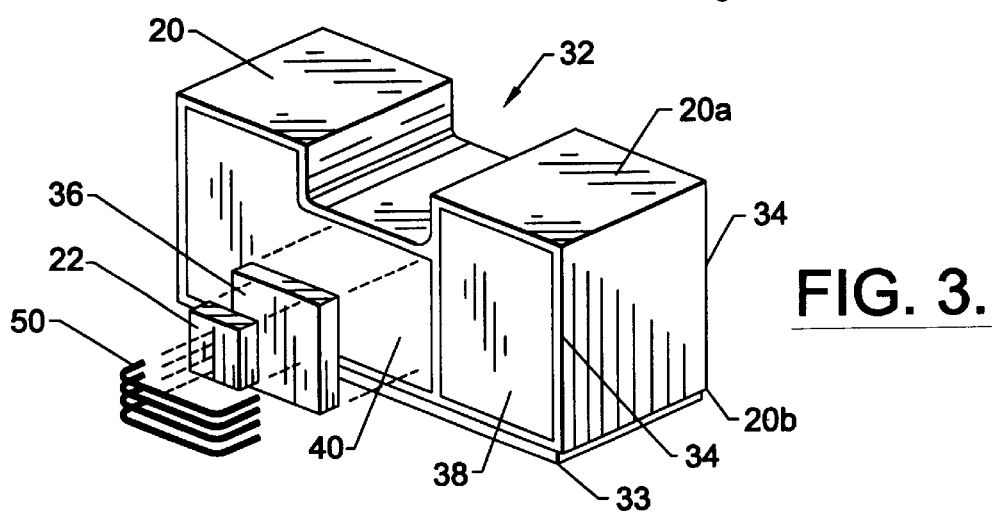
FIG. 3 is an exploded perspective view of a submount, a thermal spreader and a laser diode of the microlaser apparatus of FIG. 2.

As shown in FIGS. 2–4, the plurality of pump sources 22 of this embodiment of the microlaser apparatus 18 are preferably mounted upon endwalls 34 of the submounts 20 so as to pump respective portions of the microlaser 26. For example, a laser diode can be operably mounted upon each opposed endwall of a submount in order to pump those portions of the active gain medium 24 of the microlaser which overlie the respective laser diodes.

As shown in FIGS. 2–4, each laser diode 22 can be mounted upon a thermal spreader 36 formed of a thermally conductive material which, in turn, is mounted upon an endwall 34 of submount 20. For example, the thermal spreader may be formed of gold metallized diamond. In this regard, the diamond is typically a synthetic diamond that has been grown by a chemical vapor deposition process. Once grown, the diamond is generally polished and a gold coating is evaporatively deposited upon the diamond. The thermal spreader also generally has a larger footprint than the laser diode so as to effectively spread the heat generated by the laser diode over a broader area of the submount.

As shown in FIGS. 3 and 4, electrical contacts 38, 40 are preferably formed on each submount 20. According to one advantageous embodiment in which each laser diode can be separately actuated, a pair of electrical contacts, i.e., a cathode and an anode, are preferably formed on the submount for each laser diode. While the electrical contacts can be formed in a variety of different patterns and electrical connections can be established between the electrical contacts and respective ones of the laser diodes in a variety of manners, the microlaser apparatus 18 of the illustrated embodiment includes electrical contacts in the form of DBCu pads formed upon the endwalls 34 of the submounts. In this regard, each laser diode 22 and, more particularly, each thermal spreader 36 is preferably mounted upon the electrical contact pad 38 which forms the anode. Since the laser diodes of the illustrated embodiment are mounted upon thermal spreaders which are coated with a conductive material, such as gold, electrical signals applied to the anode will be transmitted to the respective laser diode. In contrast, wire bonds or ball bonds 50 are generally formed from the electrical contact pad 40 which defines the cathode to the laser diode. As such, the application of a voltage differential between the anode and the cathode associated with a respective laser diode will activate the laser diode as known to those skilled in the art.

According to another embodiment illustrated in FIG. 5, the submount 20 defines a lengthwise extending groove 32 having a pair of opposed sidewalls 42. Preferably, the groove defined by the submount of this embodiment includes a lengthwise extending lower channel 44. In addition, the submount of this embodiment also preferably includes a pair of shelves 46 extending laterally outward from upper portions of the lower channel and disposed proximate to first surface 20a of the submount to thereby define an upper channel 48 that is broader than the lower channel in a lateral direction. As shown in FIG. 5, the lower channel of the groove defined by the submount of this embodiment can have a bottom surface that extends between lower portions of the opposed sidewalls and which intersects the opposed sidewalls at an angle of approximately 90°. However, the lower channel of the groove defined by the submount can have other shapes, such as a generally U-shape in lateral cross-section, without departing from the spirit and scope of the present invention.

The microlaser 26 of this embodiment of the microlaser apparatus 18 is seated within the groove 32 defined by the submount 20. In particular, the microlaser is preferably supported over the lower channel 44 by the shelves 46 such that the microlaser at least partially overlies or otherwise bridges the groove defined by the submount. As described above in conjunction with the embodiment of FIGS. 2–4, the microlaser is commonly secured to the submount by means of an epoxy disposed between the opposed lengthwise extending edges of the microlaser and the shelves defined by the submount.

Figure 5A:
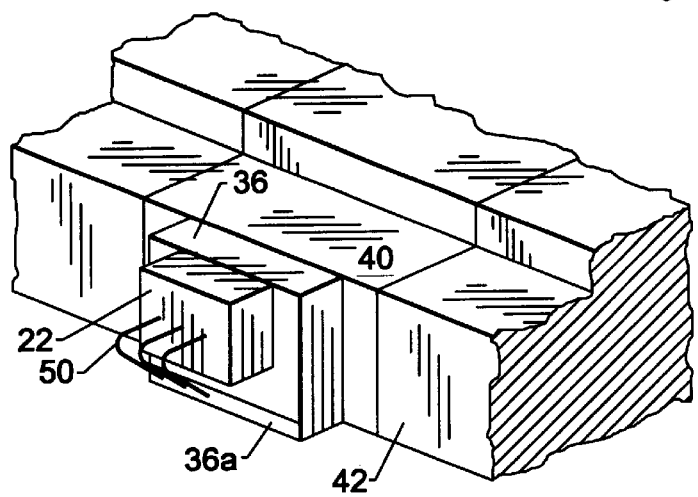
FIG. 5A is a fragmentary perspective view of a portion of the microlaser apparatus of FIG. 5 which illustrates the mounting of a thermal spreader and a laser diode upon a sidewall of a submount.

As also shown in FIGS. 5 and 5A, the microlaser apparatus 18 of the embodiment includes a plurality of pump sources, such as laser diodes, mounted upon at least one sidewall 42 of the groove 32 defined by the submount 20 such that the outputs of the laser diodes are directed toward the opening of the groove through the first surface 20a of the submount. While the laser diodes of the microlaser apparatus of FIG. 5 are mounted upon only one of the opposed sidewalls of the groove defined by the submount, the laser diodes can be mounted upon both sidewalls of the groove defined by the submount, if so desired.

As described above in conjunction with the embodiment of the microlaser apparatus 18 in FIGS. 2–4, the laser diodes 22 are preferably mounted upon respective thermal spreaders 36. The thermal spreaders are, in turn, mounted upon a sidewall 42 of the groove defined by the submount 20 and function to spread the heat generated by the laser diodes over a broader area of the submount.

Each thermal spreader 36 generally extends between opposed first and second edges. As such, each laser diode 22 is generally mounted adjacent the first edge of the respective thermal spreader. Preferably, the thermal spreaders and the groove 32 defined by the submount 20 are sized such that the laser diodes are properly spaced from the microlaser 26 by positioning the thermal spreaders so that the second edge of the thermal spreaders contact the bottom surface of the groove defined by the submount. While the laser diodes can be spaced from the microlaser by different amounts as known to those skilled in the art, the laser diodes of one advantageous embodiment are preferably spaced from the microlaser by 20±5 microns.

As also described above, electrical contacts are preferably formed on the submount 20. According to one advantageous embodiment in which each laser diode 22 can be separately actuated, a pair of electrical contacts, i.e., a cathode and an anode, are preferably formed on the submount for each laser diode. While the electrical contacts can be formed in a variety of different patterns and electrical contacts can be established between the electrical contacts and the respective ones of laser diodes in a variety of manners, the microlaser apparatus 18 of the illustrated embodiment includes DBCu electrical contacts which extend in the stripes 38, 40 laterally across the first surface and the opposed sidewalls of the submount. While the stripes of DBCu can be formed upon a generally planar first surface, the first surface of the submount can be patterned so as to define a number of troughs within which the stripes of DBCu are deposited such that the upper surface of the stripes of DBCu are generally flush with the upper surface of the submount.

In the embodiment illustrated in FIGS. 5 and 5A, for example, the anode contacts 40 preferably extend laterally across the portion of the first surface 20a of the submount 20 on one side of the groove 32 and downwardly along one sidewall 42 of the groove. Similarly, the cathode contacts 38 preferably extend across the portion of the first surface of the submount on the opposite side of the groove and downwardly along the other sidewall of the groove. As such, the laser diodes can be mounted upon a sidewall defined by the groove such that each laser diode and, more particularly, each thermal spreader 36 is mounted upon a respective anode contact. Since the laser diodes of the illustrated embodiment are mounted upon thermal spreaders which are coated with a conductive material, electrical signals applied to respective ones the anode contacts will be transmitted to respective ones of laser diodes. In contrast, wire bonds or ball bonds are generally formed from the electrical contacts which define the cathodes to respective ones of the laser diodes.

As shown in FIG. 5A, the thermal spreader 36 can define a region 36a that is coated with a conductive material, such as gold, but is electrically separated from the conductive material which coats the remainder of the thermal spreader. As such, ball bonds can be formed from the laser diode 22 to the region 36 that is electrically separated from the conductive material coating the remainder of the thermal spreader. In addition, one or more wire bonds can be formed between the cathode contact 38 that extends downwardly along the opposite sidewall 42 of the groove 32 and the region 36 that is electrically separated from the conductive material coating the remainder of the thermal spreader. As such, electrical contact can also be readily established between the cathode contact and the laser diode. More importantly, the application of a voltage differential between the anode and cathode associated with a respective laser diode can activate the respective laser diode as known to those skilled in the art.

Figure 6:
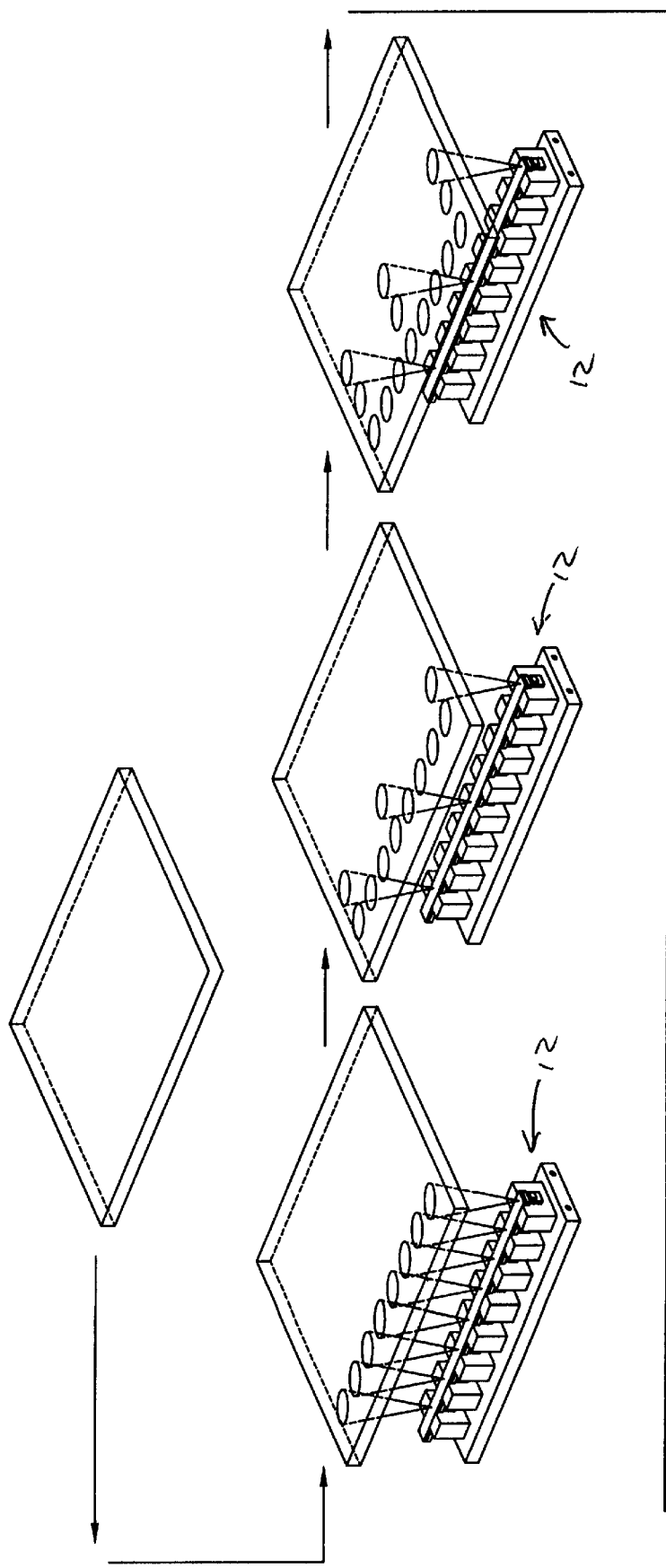
FIG. 6 is a schematic representation of a plurality of laser marking stations which illustrates the laser outputs provided by different portions of the microlasers of the laser marking stations as well as the resulting marks imprinted upon the workpiece.

By activating respective ones of the laser diodes 22 of either embodiment of the microlaser apparatus 18, different portions of the active gain medium 24 of the microlaser 26 will be pumped such that one or more laser pulses are generated. In the embodiment of the laser marking system 12 designed to mark a workpiece with a dot matrix pattern comprised of a predetermined number of pixels, each laser diode of the microlaser apparatus is generally associated with a respective pixel of the dot matrix pattern, as shown in FIG. 6. In other words, the activation of each laser diode of the microlaser apparatus generally provides a laser pulse which creates a respective pixel of the dot matrix pattern.

Thus, to mark a workpiece with a dot matrix pattern having columns formed of eight dots, the microlaser apparatus 18 of the illustrated embodiment would preferably include eight laser diodes 22. For example, the microlaser apparatus of the embodiment illustrated in FIGS. 2–4 can include laser diodes mounted upon both opposed endwalls 34 of each of four different submounts 20. Alternatively, the microlaser apparatus of the embodiment of FIGS. 2–4 can include eight laser diodes mounted upon respective endwalls of each of eight different submounts. Still further, the microlaser apparatus of the embodiment of FIG. 5 can include eight laser diodes mounted upon and spaced lengthwise along a sidewall 42 of a lengthwise extending groove 42 defined by the submount.

As such, actuation of respective ones of the laser diodes 22 will pump the active gain medium 24 of the microlaser 26 and, in turn, generate a laser pulse. Since actuation of different ones of the laser diodes pump different portions of the active gain medium, the microlaser apparatus 18 of the present invention is preferably designed such that actuation of a respective laser diode causes the microlaser to emit a laser pulse which produces a respective one of the pixels of the resulting dot matrix pattern marked upon a workpiece. See FIG. 6. In order to appropriately form and shape the laser pulses, however, the laser marking system 12 can also include appropriate optical elements 58, such as lenses or the like, disposed between the microlaser apparatus and the workpiece.

Although the microlaser apparatus 18 of the illustrated embodiments includes a single microlaser 26, the microlaser apparatus can include a plurality of microlasers without departing from the spirit and scope of the present invention. For example, the microlaser apparatus can include the same number of microlasers as pump sources 22 such that one microlaser is associated with each laser diode.

While the microlaser apparatus 18 of the present invention is particularly useful in laser marking systems 12 for marking workpieces, such as cans, bottles or the like, the microlaser system can perform a variety of other functions, such as by serving as an optical printhead, an optical scanner or an optical writing device for laser printing or the like. As such, other embodiments of the laser marking system have been designed which produce a multicolor output having a predetermined pattern. Although the laser marking system of these embodiments can be constructed in a variety of manners, the laser marking system of one advantageous embodiment include groups of pump sources 22, such as groups of laser diodes, operably mounted upon the submount 20. Typically, each group of laser diodes includes the same number of laser diodes as the number of different colors which the laser marking system is designed to generate. Thus, each group of laser diodes of one embodiment includes three laser diodes in order to generate red, blue and green light which can thereafter be mixed to form a variety of other colors, as known to those skilled in the art. In this embodiment, the individual laser diodes of each group are individually driven or activated by the control system 16 so as to cooperably pump the active gain medium 24 of the microlaser 26 in order to produce the desired multicolored output.

Figure 7:
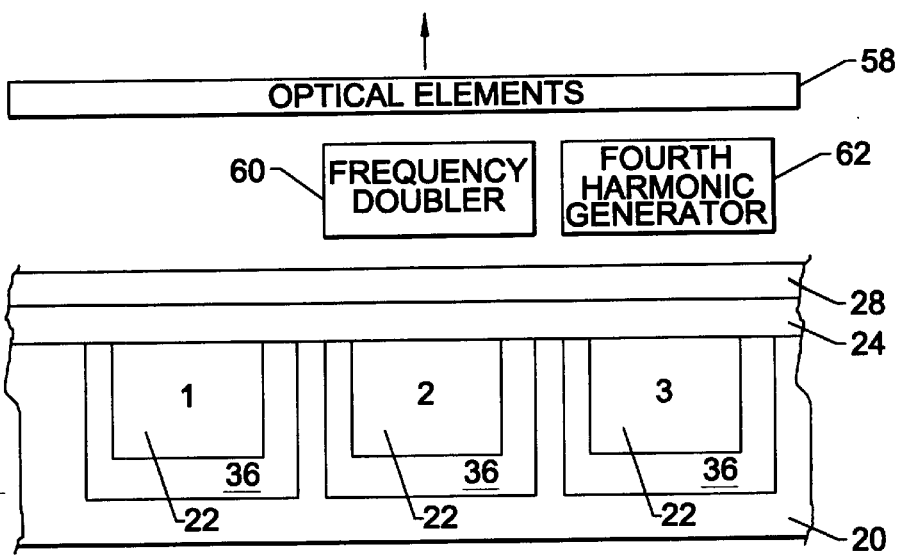
FIG. 7 is a fragmentary schematic view of a portion of a laser marking system that produces a multicolor output and that includes a group of laser diodes, a microlaser and various frequency multiplication elements.

According to this embodiment, each laser diode 22 is typically the same as the other laser diodes of the respective group. In order to generate a multicolor laser output, however, the laser pulses emitted by the microlaser 26 following pumping by respective ones of the laser diodes of the group are preferably processed, such as by multiplying the frequency of the laser pulses, in order to create laser pulses of the desired color. As shown in FIG. 7, for example, a laser marking system which includes first, second and third laser diodes can include a frequency doubling crystal 60, typically formed of $KTiOPO_4$, i.e., KTP, for receiving the laser pulses emitted by the microlaser following pumping by the second laser diode. Similarly, the laser marking system can include a fourth harmonic generator 62, typically formed of barium borate $BaB_2O_4$, i.e., BBO, disposed downstream of the microlaser for receiving laser pulses emitted by the microlaser in response to pumping by the third laser diode. Although the laser marking system can include a separate frequency doubling crystal and a separate fourth harmonic generator for each group of laser diodes, a single frequency doubling crystal and/or a single fourth harmonic generator can be utilized for all of the laser marking systems, if so desired.

For purposes of illustration, a microlaser designed to produce a laser output having a wavelength of 1.064 microns is described hereinbelow. However, the microlaser can be designed to emit laser outputs having other wavelengths without departing from the spirit and scope of the present invention. For a microlaser which emits pulses having a wavelength of 1.064 microns, however, the frequency doubling crystal and the fourth harmonic generator will produce laser pulses having wavelengths of 532 microns and 266 microns, respectively. As known to those skilled in the art, laser pulses having wavelengths of 532 microns and 266 microns are perceived as green light and ultra-violet light, respectively. Since the laser pulses emitted by the microlaser in response to pumping by the first laser diode are not altered in frequency according to this embodiment, the laser marking system can therefore generate laser pulses which can be either infra-red, green or ultra-violet in color depending upon whether the microlaser is pumped by the first, second or third laser diode, respectively. In addition, by controllably mixing the resulting laser pulses, outputs having other colors can be produced. Accordingly, the laser marking system of this advantageous embodiment can create a dot matrix pattern or any other predefined pattern in which each element or pixel of the pattern can have a variety of colors depending upon which laser diode of each group pumps the microlaser.

Although not necessary for the practice of the present invention, the microlaser apparatus 18 is generally mounted within an electro-optic package, such as TO-8 package or a TO-3 package. As known to those skilled in the art, an electro-optic package generally includes a plurality of conductive pins surrounding the microlaser apparatus. By establishing appropriate electrical connections between the conductive pins of the package and the respective electrical contacts of the microlaser apparatus, and any electrical leads associated with the heat sink 30, the microlaser apparatus can be operated by appropriate driving the conductive pins of the electro-optic package in order to produce the desired output.

Therefore, the microlaser apparatus 18 of the present invention includes a submount 20 which facilitates the alignment of a plurality of pump sources 22, such as a plurality of laser diodes, with at least one microlaser 26 in order to controllably pump different portions of the active gain medium 24 of the microlaser. By incorporating a microlaser apparatus, the laser marking system 12 of the present invention can produce a predefined laser output having a number of pixels, such as for marking a workpiece, without requiring one or more masks. As such, the complexity and, correspondingly, the cost of the marking system is reduced relative to conventional laser marking systems. Moreover, the laser marking apparatus of one advantageous embodiment of the present invention is designed to provide a multicolor laser output.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A laser marking system adapted to impart a mark comprised of a plurality of pixels upon a workpiece, wherein the laser marking system comprises:

at least one submount;

a plurality of laser diodes operably mounted upon said at least one submount; and at least one microlaser comprising an active gain medium and a saturable absorber, said microlaser disposed in alignment with said plurality of laser diodes such that pump signals emitted by said plurality of laser diodes pump respective portions of the active gain medium of said microlaser to produce a laser output, wherein each pixel of the resulting mark is produced by the laser output of a different portion of the active gain medium of said microlaser in response to pumping by at least one of said laser diodes.

2. A laser marking system according to claim 1 wherein said at least one submount comprises a plurality of submounts positioned in a spaced apart relationship, wherein said laser diodes are mounted upon respective ones of said submounts, and wherein said microlaser extends across and is supported by said plurality of submounts.

3. A laser marking system according to claim 2 wherein each submount defines a groove, and wherein said microlaser is seated within the grooves defined by said plurality of submounts and extends unsupported between said submounts.

4. A laser marking system according to claim 1 wherein said at least one submount defines a groove having at least one sidewall and opening through a first surface of said submount, wherein said plurality of laser diodes are operably mounted upon said at least one sidewall of the groove defined by said submount such that outputs of said laser diodes are directed toward the opening of the groove through the first surface of said submount, and wherein said at least one microlaser is seated within the groove defined by said submount such that the outputs of said laser diodes pump said microlaser to produce the laser output.

5. A laser marking system according to claim 4 wherein the groove defined by said submount includes a lengthwise extending lower channel, wherein said submount includes a pair of shelves extending laterally from the lower channel and disposed proximate the first surface of said submount to thereby define an upper channel that is broader than the lower channel in a lateral direction, wherein said at least one microlaser is supported over the lower channel by said shelves, and wherein said laser diodes are operably mounted upon portions of the sidewalls which define the lower channel such that the output of said laser diodes is directed toward said at least one microlaser that extends over the lower channel.

6. A laser marking system according to claim 1 wherein said plurality of laser diodes comprises a plurality of groups of laser diodes, and wherein each group of laser diodes cooperably pumps a respective portion of the active gain medium of said microlaser so as to produce a laser output which creates a respective pixel of the resulting mark.

7. A laser marking system according to claim 6 further comprising at least one frequency multiplication element associated with each group of laser diodes for multiplying the frequency of the laser output produced by the respective portion of the active gain medium of said microlaser to thereby generate a pixel of a predetermined color.

8. A laser marking system according to claim 7 wherein each group of laser diodes comprises first, second and third pump sources for separately pumping the respective portion of the active gain medium of said microlaser, and wherein the at least one frequency multiplication element comprises first and second frequency multiplication elements for multiplying the frequency of the laser output produced by the respective portion of the active gain medium of said microlaser in response to pumping by the second and third laser diodes, respectively, to thereby generate a multicolor pixel.

9. A laser marking system according to claim 1 further comprising a plurality of thermal spreaders mounted upon said submount, wherein each laser diode is mounted upon a respective thermal spreader.

10. A laser marking system according to claim 1 wherein said at least one submount is comprised of a thermally conductive, electrically insulating material.

11. A laser marking system comprising:
at least one submount defining a groove opening through a first surface of said submount;
a plurality of pump sources for emitting pump signals directed through the opening defined in the first surface of said at least one submount; and
at least one microlaser having opposed first and second surfaces and comprising an active gain medium proximate the first surface and a saturable absorber proximate the second surface, said microlaser seated within the groove defined by said at least one submount such that portions of the first surface of said microlaser contact said at least one submount while other portions of the first surface of said microlaser are spaced from said at least one submount, said microlaser disposed in alignment with the pump signals emitted by said plurality of pump sources such that the pump signals pump portions of the active gain medium of said microlaser that are spaced from said at least one submount.

12. A laser marking system according to claim 11 wherein said at least one submount comprises a plurality of submounts positioned in a spaced apart relationship, wherein said pump sources are mounted upon respective ones of said submounts, and wherein said microlaser extends across and is supported by said plurality of submounts.

13. A laser marking system according to claim 11 wherein the groove defined by said submount includes a lengthwise extending lower channel, wherein said submount includes a pair of shelves extending laterally from the lower channel and disposed proximate the first surface of said submount to thereby define an upper channel that is broader than the lower channel in a lateral direction, and wherein said at least one microlaser is supported over the lower channel by said shelves.

14. A laser marking system according to claim 13 wherein said plurality of pump sources are operably mounted upon portions of the sidewalls which define the lower channel such that pump signals emitted by said pump sources are directed toward said microlaser that extends over the lower channel.

15. A laser marking system according to claim 11 wherein said plurality of pump sources comprises a plurality of groups of pump sources, and wherein each group of pump sources cooperably pumps a respective portion of the active gain medium of said microlaser so as to produce a laser output which creates a respective pixel of a resulting mark.

16. A laser marking system according to claim 15 further comprising at least one frequency multiplication element associated with each group of pump sources for multiplying the frequency of the laser output produced by the respective portion of the active gain medium of said microlaser to thereby generate a pixel of a predetermined color.

17. A laser marking system according to claim 16 wherein each group of pump sources comprises first, second and third pump sources for separately pumping the respective portion of the active gain medium of said microlaser, and wherein the at least one frequency multiplication element comprises first and second frequency multiplication elements for multiplying the frequency of the laser output produced by the respective portion of the active gain medium of said microlaser in response to pumping by the second and third pump sources, respectively, to thereby generate a multicolor pixel.

18. A laser marking system according to claim 11 further comprising a plurality of thermal spreaders mounted upon said submount, wherein each pump source is mounted upon a respective thermal spreader.

19. A laser marking system according to claim 11 wherein said at least one submount is comprised of a thermally conductive, electrically insulating material.

20. A microlaser apparatus comprising:
a plurality of submounts positioned in a spaced apart relationship;
a plurality of pump sources operably mounted upon respective ones of said submounts; and
a monolithic active gain medium extending across and supported by said plurality of said submounts such that pump signals emitted by said pump sources pump portions of said active gain medium in order to produce a laser output.

21. A microlaser apparatus according to claim 20 wherein said plurality of submounts each define a respective groove extending lengthwise between opposed endwalls, and wherein said monolithic active gain medium is seated within the grooves defined by said plurality of submounts and extends unsupported between said submounts.

22. A microlaser apparatus according to claim 21 wherein said pump sources are mounted upon the endwalls of said submounts such that the pump signals emitted by said pump sources are directed toward said monolithic active gain medium that is supported by said plurality of submounts.

23. A microlaser apparatus according to claim 20 further comprising at least one microlaser which includes said active gain medium and a saturable absorber.

24. A microlaser apparatus according to claim 20 further comprising a plurality of thermal spreaders mounted upon respective ones of said submounts, wherein said plurality of pump sources comprise a plurality of laser diodes, and wherein each laser diode is mounted upon a respective thermal spreader.

25. A microlaser apparatus according to claim 20 wherein each submount is comprised of a thermally conductive, electrically insulating material.

26. A microlaser apparatus comprising:
a submount defining a groove having at least one sidewall and opening through a first surface of said submount;
a plurality of pump sources operably mounted upon said at least one sidewall of the groove defined by said submount such that pump signals emitted by said pump sources are directed toward the opening of the groove through the first surface of said submount; and
at least one microlaser comprising an active gain medium and a saturable absorber, said microlaser at least partially overlying the groove defined by said submount such that the pump signals emitted by said pump sources pump said microlaser to thereby produce a laser output.

27. A microlaser apparatus according to claim 26 wherein said at least one microlaser is seated within the groove defined by said submount such that the pump signals emitted by said pump sources pump said microlaser to produce the laser output.

28. A microlaser apparatus according to claim 27 wherein the groove defined by said submount includes a lengthwise extending lower channel, wherein said submount includes a pair of shelves extending laterally from the lower channel and disposed proximate the first surface of said submount to thereby define an upper channel that is broader than the lower channel in a lateral direction, and wherein said at least one microlaser is supported over the lower channel by said shelves.

29. A microlaser apparatus according to claim 28 wherein said plurality of pump sources are operably mounted upon portions of the sidewalls which define the lower channel such that pump signals emitted by said pump sources are directed toward said microlaser that extends over the lower channel.

30. A microlaser apparatus according to claim 26 further comprising a plurality of thermal spreaders mounted upon said at least one sidewall of the groove defined by said submount, wherein said plurality of pump sources comprise a plurality of laser diodes, and wherein each laser diode is mounted upon a respective thermal spreader.

31. A microlaser apparatus according to claim 30 wherein each thermal spreader extends between first and second opposed edges, wherein each laser diode is mounted adjacent the first edge of the respective thermal spreader, and wherein said thermal spreaders and the groove defined by said submount are sized such that said laser diodes are properly spaced from said microlaser by positioning said thermal spreaders so that the second edge of said thermal spreaders contact a bottom surface of the groove defined by said submount.

32. A microlaser apparatus according to claim 26 wherein said submount is comprised of a thermally conductive, electrically insulating material.

\* \* \* \* \*